(No Model.)
W. STEWART.
SODA WATER APPARATUS.
No. 547,816. Patented Oct. 15, 1895.
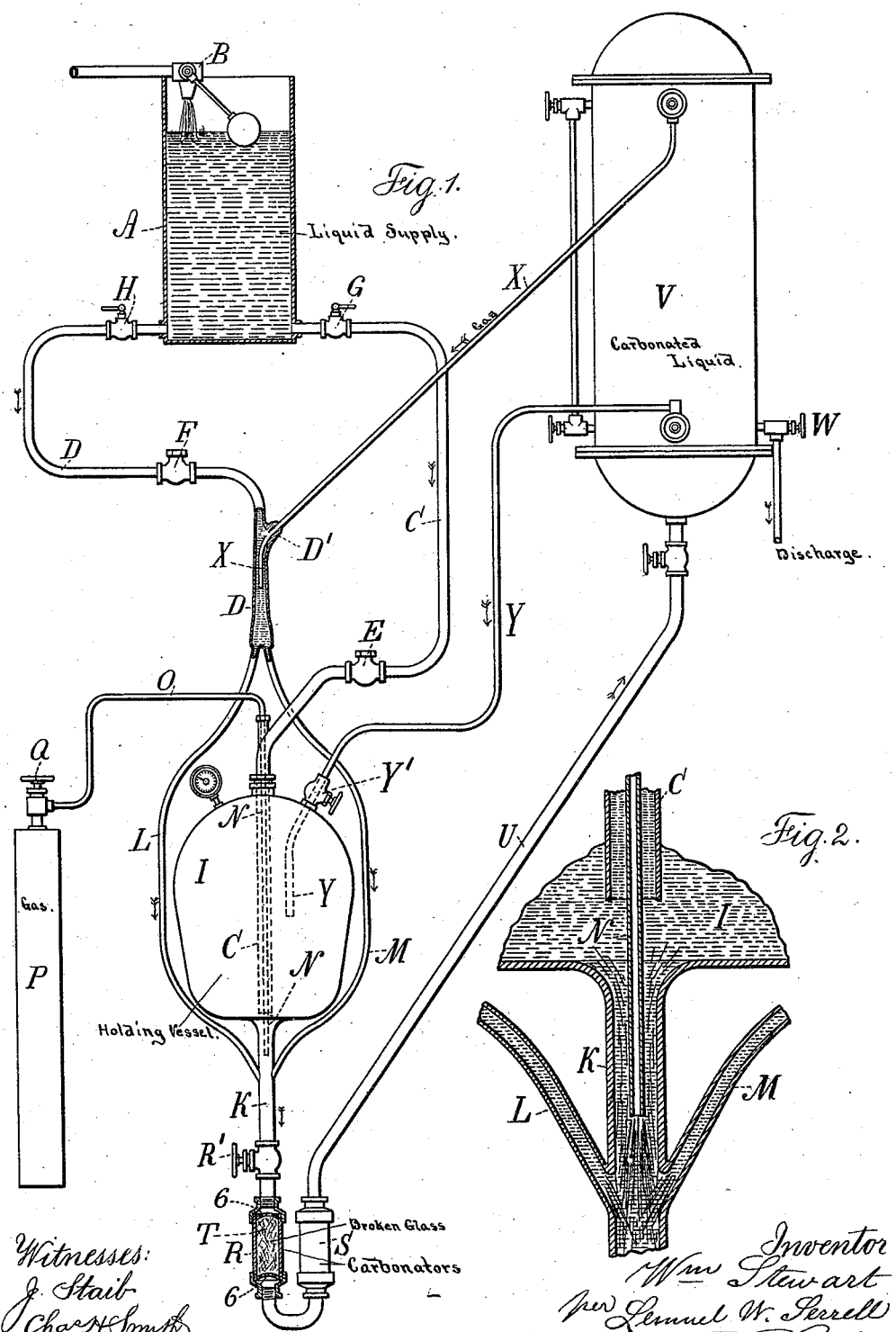

UNITED STATES PATENT OFFICE.

WILLIAM STEWART, OF BROOKLYN, NEW YORK.

SODA-WATER APPARATUS.

SPECIFICATION forming part of Letters Patent No. 547,816, dated October 15, 1895.

Application filed January 28, 1895. Serial No. 536,411. (No model.)

*To all whom it may concern:*

Be it known that I, WILLIAM STEWART, a citizen of the United States, residing at Brooklyn, in the county of Kings and State of New York, have invented an Improvement in Soda-Water Apparatus, of which the following is a specification.

In the manufacture of soda-water the carbonic acid and water require to be intimately commingled under a suitable pressure for causing the water to take up the carbonic acid in the proper proportion for producing the necessary effervescence when the soda-water is drawn into a tumbler. Efforts have heretofore been made to employ liquid carbonic acid and allow the same to escape and by its pressure inject itself into the water and at the same time to produce a circulation of the water, so as to produce a mixing action between the carbonic acid and the water; but difficulties have been experienced. In the first instance the carbonic-acid gas expanding from the liquid produces an intense cold and causes the apparatus to freeze up and stop working, and as the temperature may increase and the gas begin to exert its pressure again the apparatus fills with gas in place of circulating the water and mixing the gas with the water. I have discovered that the mixing operation can only be properly performed when the water is caused to accumulate by gravity immediately around the jet-pipe through which the carbonic acid issues, and the partially-charged water is caused to circulate along with the water upon which the jet of carbonic-acid gas acts directly, so that the maximum movement is given to the water to commingle the same and the carbonic acid without the opportunity for the carbonic acid to expand and fill the apparatus and displace the water and cause the operations to stop, and my present invention relates to the construction of apparatus hereinafter shown and the combination of parts described and claimed.

In the drawings, Figure 1 is an elevation of the apparatus, partially in section; and Fig. 2 is a section in larger size of the junction of the jet-pipe and the liquid-supply pipe.

The barrel or vessel A is adapted to receive distilled water, preferably from a pipe fitted with a float or ball cock B, so that such barrel will be maintained in a normally-full condition, and from this barrel the pipes C and D pass, and there are check-valves E and F to prevent the gaseous pressure in the apparatus driving the water back into the barrel A, and the valves or cocks G H regulate the supply of water. The lower end of the pipe C passes into the holding-vessel I and descends to near the bottom of such vessel, where there is an outlet and mixing pipe K, and the pipe D has two branches L and M, that join at their lower ends to the mixing-pipe K, and there is a fine jet-tube N within the lower part of the pipe C, the same passing vertically through such pipe and extending below the same into the mixing-pipe K, and this jet-tube N is connected by a pipe O with the holder P for liquid carbonic acid, and there is a valve Q for regulating the discharge of the carbonic-acid gas from the holder P.

From the lower end of the mixing-pipe K there is a connection to the carbonating-vessels R and S, which vessels may be of any suitable size, and there may be one, two, or more of such carbonating-vessels, and each of these vessels is provided with grates or perforated plates 6 for holding within such carbonating-vessels pieces of glass or similar material, preferably vitreous, for the water and carbonating-acid gas to be forced through such vessels and by the agitation produced by the pieces of glass at T, or similar material, the water and the carbonating-acid gas are agitated and caused to commingle and finally pass by the pipe U to a holder or tank V, which is adapted to hold the proper supply of soda-water, and from this the materials may be drawn by a faucet W in the usual manner; and it is advantageous to bring a pipe X from the upper part of the tank V to a branch D' of the pipe D, where such pipe terminates as a jet-pipe within the pipe D, the same acting downwardly, so that the pressure of gas in the upper part of the holder or tank V may be discharged through the pipe X and pass into the liquid and through the carbonating-vessels, so that such gas may be taken up and absorbed by the water, and this is especially advantageous for discharging carbonating-acid gas from the upper part of the holder or tank V, as fresh liquid may be forced into the bottom part of the tank through the pipe U. The branch pipes L M extend from the lower end of the pipe D to the mixing-pipe K, where they enter at acute angles, so as to incline downwardly and in the direction of the flow of the liquid, and the valve R' in the pipe leading to the carbonating-vessel R serves to regulate the flow of fluid and stop the same whenever necessary.

In starting the apparatus it is advantageous to allow water from the barrel A to fill the pipes D L M C and the vessel I, and to open the valve R' slightly and also to turn on the carbonic acid from the holder P by slightly opening the regulating-cock Q, so that the gaseous carbonic acid passes by the pipe O and jet-tube N and issues in a fine and rapid jet into the mixing-chamber K, driving the water downwardly into the carbonating-vessels R and S, in which the movement of the water and the gas, while in contact with the pieces of broken glass, cause a rapid and intimate intermingling and mixing of the water and gas, so that the carbonic acid is absorbed and the water is driven up into the tank or holder V, and the movement caused by the issuing jet of carbonic-acid gas draws the water from the holding-vessel I and causes the circulation back through the pipe Y and valve Y' into the vessel I, and the action of the jet of carbonic-acid gas being downwardly and into the mixing-pipe K prevents the gas from rising and keeps the column of water as it circulates as nearly free from separate bubbles of gas as possible, so that there is no risk of the apparatus stopping in consequence of the gas displacing the water, and as soon as the gas is so absorbed by the water that more water is required the check-valves E and F open and allow the same to pass, and under all circumstances the issuing jet of carbonic-acid gas acts as an injector to drive the liquid forward, notwithstanding the pressure that exists in the apparatus itself. Hence the carbonic-acid gas is intimately and rapidly mixed with the water and a circulation is maintained as long as the pressure of the incoming carbonic-acid gas is greater than the pressure of the gas within the holder or tank V. The carbonic-acid gas will accumulate in the top of the vessel V, and there will be as much pressure in the vessel V as there is in any other part of the apparatus, and this carbonic-acid gas has to be carried away and again mixed with the water, and this is effected by the pipe X, which terminates as a jet-tube within the supply-pipe D, and the issuing of the carbonic-acid gas by the pressure from the end of the jet-tube will cause the water to draw down from the barrel A and flow to the mixing-pipe K. By this means the pressure of carbonic-acid gas in the tank V is relieved and the circulation of the water, as it becomes impregnated with the carbonic-acid gas, is promoted.

It will be apparent that in my apparatus the water-holding barrel A is not exposed to pressure, as has heretofore been the case in soda-water apparatus. Hence the water can be supplied thereto automatically, and the pipe X leads the gas from the upper part of the holder V to the fresh water in the pipe D. Hence the carbonic acid is taken up by such fresh water and carried down with the water to the mixing-pipe K, where there is an additional charge of carbonic acid supplied to drive the water into the carbonators. Hence a maximum amount of gas is driven into and taken up by the water, and the soda-water is adapted to immediate use, and the apparatus is substantially automatic in supplying the soda-water in proportion to the amount that is drawn off.

There is no blow-off or waste of gas in my apparatus, and no pump or mechanical force is required in producing the circulation of the water and the absorption of the gas.

I claim as my invention—

1. The combination with a supply barrel or vessel for water and a supply of carbonic acid gas under pressure, of a holding vessel, a check valve and supply pipe leading to the same, and a mixing pipe at the lower end of the holding vessel, and a jet tube for carbonic acid gas opening into such mixing pipe for driving the water downwardly by the action of the issuing jet of carbonic acid gas, a carbonating vessel through which the water and gas pass, and a holder or tank for receiving the same, substantially as set forth.

2. The combination with a supply barrel or vessel for water and a supply of carbonic acid gas under pressure, of a holding vessel, a check valve and supply pipe leading to the same, and a mixing pipe at the lower end of the holding vessel, and a jet tube for carbonic acid gas opening into such mixing pipe for driving the water downwardly by the action of the issuing jet of carbonic acid gas, a carbonating vessel through which the water and gas pass, and a holder or tank for receiving the same, and a second water supply pipe passing at an inclination into the mixing pipe, substantially as set forth.

3. The combination with a supply barrel or vessel for water and a supply of carbonic acid gas under pressure, of a holding vessel, a check valve and supply pipe leading to the same, and a mixing pipe at the lower end of the holding vessel, and a jet tube for carbonic acid gas opening into such mixing pipe for driving the water downwardly by the action of the issuing jet of carbonic acid gas, a carbonating vessel through which the water and gas pass, and a holder or tank for receiving the same, and a second water supply pipe passing at an inclination into the mixing pipe, a circulating pipe passing back from the holder or tank to the holding vessel, and opening toward the mixing pipe, substantially as set forth.

4. The combination with a supply barrel or vessel for water and a supply of carbonic acid gas under pressure, of a holding vessel, a check valve and supply pipe leading to the same, and a mixing pipe at the lower end of the holding vessel, and a jet tube for carbonic acid gas opening into such mixing pipe for driving the water downwardly by the action of the issuing jet of carbonic acid gas, a carbonating vessel through which the water and gas pass, and a holder or tank for receiving the same, and a second water supply pipe passing at an inclination into the mixing pipe, and a pipe for leading the carbonic acid gas from the upper part of the holder or tank back into one of the water supply pipes, substantially as set forth.

Signed by me this 24th day of January, 1895.

WILLIAM STEWART.

Witnesses:
GEO. T. PINCKNEY,
S. T. HAVILAND.